United States Patent [19]

Juang et al.

[11] Patent Number: 5,225,118
[45] Date of Patent: Jul. 6, 1993

[54] PROCESS FOR MANUFACTURING POLYUREA MICROCAPSULES AND PRODUCT THEREFROM

[75] Inventors: Mike S. D. Juang, Vancouver, Wash.; Robert W. Brunea, West Linn, Oreg.

[73] Assignee: Boise Cascade Corporation, Del.

[21] Appl. No.: 567,809

[22] Filed: Aug. 15, 1990

[51] Int. Cl.$^5$ .............................................. B01J 13/16
[52] U.S. Cl. ..................................... 264/4.7; 264/4.33; 428/402.2
[58] Field of Search .......................... 264/4.7, 4.33; 428/402.2

[56] References Cited

U.S. PATENT DOCUMENTS

| | | | |
|---|---|---|---|
| 3,796,669 | 3/1974 | Kiritani et al. | 264/4.7 X |
| 3,900,669 | 8/1975 | Kiritani | 264/4.7 X |
| 3,914,511 | 10/1975 | Vassiliades | 428/411 |
| 4,021,595 | 5/1977 | Kiritani et al. | 503/213 |
| 4,119,565 | 10/1978 | Baatz et al. | 264/4.7 X |
| 4,140,516 | 2/1979 | Scher | 264/4.7 X |
| 4,193,889 | 3/1980 | Baatz et al. | 264/4.7 X |
| 4,253,682 | 3/1981 | Baatz et al. | 264/4.7 X |
| 4,299,723 | 11/1981 | Dahm et al. | 428/402.21 |
| 4,324,817 | 4/1982 | Dahm et al. | 427/150 |
| 4,356,108 | 10/1982 | Schwab et al. | 264/4.7 |
| 4,379,071 | 4/1983 | Schnöring et al. | 264/4.7 |
| 4,402,856 | 9/1983 | Schnöring et al. | 428/402.22 |
| 4,409,201 | 10/1983 | Heinrich et al. | 428/402.21 X |
| 4,412,959 | 11/1983 | Wegner et al. | 264/4.1 |
| 4,428,978 | 1/1984 | Jabs et al. | 427/150 |
| 4,428,983 | 1/1984 | Nehen et al. | 427/213.34 |
| 4,592,957 | 6/1986 | Dahm et al. | 428/402.21 |
| 4,668,580 | 5/1987 | Dahm et al. | 428/402.21 |
| 4,738,898 | 4/1988 | Vivant | 428/402.21 |
| 4,785,048 | 11/1988 | Chao | 524/745 |
| 4,847,152 | 7/1989 | Jabs et al. | 428/402.21 |
| 4,915,947 | 4/1990 | Thenard et al. | 264/4.7 X |
| 5,112,540 | 5/1992 | Chen et al. | 264/4.7 |

Primary Examiner—Robert L. Stoll
Assistant Examiner—John M. Covert
Attorney, Agent, or Firm—Klarquist, Sparkman, Campbell, Leigh & Whinston

[57] ABSTRACT

Two embodiments of a process for producing concentrated suspensions of polyurea microcapsules especially suitable for manufacturing carbonless copy paper (CCP) are disclosed. Either embodiment can be a batch or continuous process. In the first embodiment, a liquid hydrophobic phase comprising a core material and polyisocyanate at least partially soluble therein is emulsified with an aqueous continuous phase including a polyhydroxylated colloidal stabilizer to form a suspension of microdroplets of the hydrophobic phase. A polyamine such as diethylenetriamine reactive with the polyisocyanate and a catalytic amount of an alkaline base are then added, initiating an interfacial polyaddition reaction at alkaline pH which forms the polyurea microcapsules. The alkaline base is preferably NaOH, KOH, or LiOH; the polyisocyanate is preferably a biuretized or isocyanurate-modified triisocyanate of a lower alkyl diisocyanate; and the polyamine is preferably added in a stoichiometric ratio relative to the isocyanate. The second embodiment is similar to the first, except that the alkaline base is added along with a surfactant having multiple S-containing substituent groups. Also, the colloidal stabilizer may be non-polyhydroxylated, such as polyvinylpyrrolidone. Microcapsules produced by either embodiment exhibit excellent properties of impermeability to the core material and freedom from agglomeration, even at high concentration and even during an optional curing step performed at elevated temperature. The microcapsules also exhibit excellent copy-forming ability, resistance to handling-induced rupture, and storability when used in CCP.

28 Claims, No Drawings

PROCESS FOR MANUFACTURING POLYUREA MICROCAPSULES AND PRODUCT THEREFROM

FIELD OF INVENTION

The present invention relates to the microencapsulation of various materials by interfacial polyaddition. More particularly, it relates to a process for making polyurea microcapsule suspensions containing dye precursors usable for the production of pressure-sensitive carbonless copy paper.

BACKGROUND OF THE INVENTION

Pressure-sensitive carbonless copy paper (CCP) has been used for recording business transactions for a number of years. A simple modern form used for recording a transaction comprises plural stacked sheets, where the top sheet has a "transfer" coating on its underside comprising a large number of minute, evenly dispersed microcapsules. Each microcapsule is a spherical polymeric "shell" surrounding a droplet of a liquid "core material" such as a dye precursor solution. The lower sheet has a "developer" coating on its upper surface comprising a dye developer substance. When one makes inscriptive impressions of sufficient force on the upper surface of the top sheet, the microcapsules in the "transfer" coating beneath the impressions are ruptured and release their liquid contents which pass to the underlying "developer" coating. The "developer" coating converts the released dye precursor into a colored dye, thereby generating visible markings on the lower sheet corresponding to the original markings made on the top sheet.

Some CCPs utilize microcapsules containing a colored dye instead of a colorless dye precursor, obviating the need for a "developer" coating. However, use of dyes in CCPs is currently disfavored because it is preferable that the coatings containing microcapsules be colorless. A coating containing a microencapsulated dye retains the color of the dye.

Some CCPs have both the microencapsulated dye precursor and the developer in a single coating, as disclosed, for example, in Dahm et al., U.S. Pat. No. 4,324,817.

Microcapsules for various uses, including for making CCPs, can be formed by a polymerization reaction termed either "interfacial polyaddition" or "interfacial polycondensation," depending upon the polymer chemistry involved. Such processes are termed "interfacial" because the polymerization reaction that forms the microcapsule shell occurs at the interface between a first phase and a second phase, such as between two immiscible liquids. As currently practiced in the art, interfacial polymerization requires at least two separate monomers reactive at an interface to form a polymer: one at least partially soluble in the first phase but insoluble in the second phase, the other at least partially soluble in the second phase but insoluble in the first phase. The typical interfacial polymerization system as used for microencapsulation is an oily, or "hydrophobic", liquid as the first phase and a water-based, or "aqueous", liquid as the second phase.

To make CCP microcapsules, a hydrophobic monomer is added to a hydrophobic liquid which includes a dye or dye precursor material dissolved in a hydrophobic solvent. The resulting mixture, termed the "hydrophobic phase," is added to and emulsified with an aqueous liquid phase to form spherical, substantially uniformly sized microdroplets of the hydrophobic phase suspended in the aqueous phase.

"Emulsification" as used herein denotes the formation of a stable mixture ("emulsion") of at least two immiscible liquids where one liquid is fragmented into a multitude of droplets which are kept in suspension in the other liquid via the presence of a small amount of a substance termed a "stabilizer" or "emulsifier." In an emulsion as described herein, the aqueous liquid phase is termed the "continuous" phase and the totality of microdroplets of hydrophobic liquid held in stable suspension in the continuous phase is termed the "disperse" phase.

The hydrophilic wall-forming monomer should be added to the aqueous continuous phase after forming the emulsion. The hydrophobic and hydrophilic wall-forming monomers react (polymerize) at the phase interface surrounding each microdroplet, forming a rigid spherical shell around each microdroplet. At least one subsequent "curing" step is often preferred to complete the polymerization reaction.

While microencapsulation processes have been known in the prior art for quite some time, not all such processes are amenable for use in making CCP. In any event, the CCP prior art is in general agreement that there are a number of major requirements for microcapsules used in the production of CCP. See, e.g., U.S. Pat. No. 4,299,723 to Dahm et al; U.S. Pat. No. 4,253,682 to Baatz et al. These requirements are listed as follows and referred to herein as the "seven criteria".

First, the microcapsule shell must be impermeable to the core material. As used herein, the "core material" comprises the hydrophobic solution of the one or more compounds to be microencapsulated. Where microcapsules are utilized for CCPs, the core material comprises a solute (such as a dye or dye-precursor compound) dissolved in a hydrophobic solvent and may also include a second hydrophobic solvent or "diluent." Many microencapsulation processes that have been tried in the art for making CCP produce microcapsules that have an unacceptable degree of permeability to either the hydrophobic solvent, the solute, the diluent, or to any combination thereof. Permeability to the solvent or diluent causes drying of the core material inside the microcapsule, resulting in degradation of the copy-forming ability of the CCP. Permeability to the solute causes discoloration of the CCP. On the other hand, the microcapsule shells must break fairly easily upon localized application of a writing or printing force to the paper so that acceptable copies of the writing or printing can be formed using normal writing or printing forces, even if multiple "copy" sheets are used.

Second, microcapsules must be resistant to the relatively small amount of pressure applied to CCP sheets during normal storage and handling. Otherwise, unwanted marks and discoloration would appear on the sheets before use which can seriously degrade the utility of the sheets.

Third, liquid suspensions of microcapsules must be substantially free of agglomerations. Concentrated suspensions of microcapsules having polyurea shells (made from polymerization reactions of aliphatic polyisocyanates and polyamines) are known in the art to have a marked tendency to form agglomerations or clusters of microcapsules during manufacture and subsequent processing. Severe agglomeration can render the microcapsule suspension useless. Even slight agglomeration can form unacceptably granular CCP surfaces. Also, when a suspension of partially agglomerated microcapsules is applied to a paper surface, the clustered microcapsules are more easily ruptured than similar unclustered microcapsules, resulting in unwanted discoloration of the CCP and general degradation of CCP copy-forming ability. Accordingly, suspensions of evenly dispersed microcapsules are highly desired for CCPs.

Fourth, the achievable concentration of microcapsules in a suspension thereof should be as high as possible, up to 50% w/w microcapsules or more, without agglomeration is desirable. The ability to produce concentrated microcapsule suspensions without the need for an energy-intensive concentration or drying step contributes greatly to the requisite economy of CCP production. Also, a high concentration of microcapsules in the transfer coating results in less water having to be removed after application of the transfer coating to the paper surface, which also reduces manufacturing costs.

Fifth, microcapsules used for CCP must be capable of withstanding temperatures of up to about 100° C. for short periods of time. This is because, after application of a microcapsule-containing coating to a paper surface, the coating must be dried, generally by the application of heat. During such heating, the temperature of the coating can easily reach 100° C. for brief periods. The microcapsules must be able to withstand such heating without experiencing significant rupturing, leaking of core material, or other degradation of physical properties.

Sixth, CCPs must be able to withstand storage conditions, even for long periods of time at conditions of relatively high temperature and humidity. The paper must be able to survive such conditions without undergoing discoloration or significant deterioration of copy-forming ability.

Finally, it is preferable that reagents used to produce the suspension of microcapsules, as well as the CCP itself, be relatively safe and not pose a toxicological risk to the worker or consumer.

Achieving a suitably high concentration of nonagglomerated microcapsules in liquid suspension has been a persistent problem in the art. Investigators have tried a number of ways to solve this problem. For example, in Kiritani et al., U.S. Pat. No. 3,796,669, a hydrophobic polyvalent isocyanate and a hydrophobic monomer reactive with the isocyanate are combined with an oily liquid. After adding a hydrophobic polymerization catalyst, the resulting mixture is emulsified into an aqueous phase and appreciably diluted with water to prevent agglomeration of the microcapsules during formation thereof. Similar water dilution steps are also disclosed in U.S. Pat. No. 3,900,669 to Kiritani and U.S. Pat. No. 4,021,595 to Kiritani et al.

Various investigators have tried a number of other processes and polymerization chemistries in an attempt to meet the above-listed requirements, but with limited success. Reference is made to U.S. Pat. No. 4,140,516 to Scher disclosing polyurea microcapsules formed by reaction of an organic isocyanate with a phase transfer catalyst; U.S. Pat. No. 4,119,565 to Baatz et al. disclosing interfacial reactions of polycarbodiimides having terminal isocyanate groups with a hydrophilic "catalyst" such as a tertiary amine; U.S. Pat. No. 4,379,071 to Schnöring et al. in which a polyol is mixed with either phosgene or a polyisocyanate in the hydrophobic phase followed by low-temperature interfacial polymerization with a "chain lengthening agent" such as an amine or a glycol in the hydrophilic phase; U.S. Pat. No. 4,402,856 to Schnöring et al. disclosing temperature-release microcapsules formed from a reaction involving gelatin and a hardening compound; U.S. Pat. No. 4,412,959 to Wegner et al. describing microcapsules prepared by interfacial reaction of a hydrophobic N-containing heterocyclic compound with a hydrophilic compound having at least two terminal OH—, NH—, or SH— groups; U.S. Pat. No. 4,428,983 to Nehen et al. disclosing an interfacial microencapsulation process wherein both monomer reactants for forming the microcapsule wall are present in either the hydrophobic phase or the hydrophilic phase, where one reactant (generally the amine) is present in a reversibly blocked form that becomes deblocked and therefore reactive with the other reactant (generally an isocyanate compound) when the two phases are combined; U.S. Pat. No. 4,592,957 to Dahm et al. disclosing a "reverse encapsulation" process involving a hydrophilic isocyanate and a hydrophobic polyamine; and U.S. Pat. No. 4,847,152 to Jabs et al. disclosing microcapsules formed via reaction of an aromatic isocyanate with an "isocyanate-reactive" compound such as an amine.

Reference is also made to U.S. Pat. Nos. 4,253,682 to Baatz et al. and No. 4,299,723 to Dahm et al. disclosing interfacial polyaddition reactions involving triketo ring diisocyanates and diamines for forming microcapsules used in making CCPs.

Polyurea microcapsule walls formed via a reaction between a polyisocyanate and a polyamine have become one of the preferred polymerization systems for producing CCP microcapsules. With polyurea, it is possible to produce the desired combination of thin but strong capsule shells. U.S. Pat. No. 4,738,898 to Vivant is one example of such a reaction system in which a "polyisocyanato hydrophobic liquid" is interfacially reacted with a polyamine. The "polyisocyanato hydrophobic liquid" is comprised of a mixture of an aliphatic diisocyanate and an isocyanurate ring trimer of an aliphatic diisocyanate in a ratio of 0.05/1 to 0.70/1. The amount of polyamine is always in excess relative to the "polyisocyanato hydrophobic liquid," rather than in a stoichiometric ratio. Unfortunately, the use of aliphatic diisocyanates poses a serious problem from a toxicological standpoint. We have also found the method is prone to agglomeration during attempts to produce high concentrations of microcapsules when the aliphatic diisocyanate is eliminated. Finally, the microcapsules have permeability to core materials.

While Vivant does not disclose the reason for using excess amine, it is probable that the excess amine increases the formation of exposed amino groups at the interface between the exterior surface of the microcapsule and the aqueous continuous phase. Such exposed amino groups may function somewhat as a stabilizer, conferring some degree of anti-agglomeration stability to the suspension of microcapsules, at least in dilute suspensions. Unfortunately, concentrated suspensions made according to Vivant still exhibit agglomeration. Also, the excess amino groups reduce the degree of crosslinking in the polyurea shell of each microcapsule, rendering the microcapsules more permeable to the core material inside.

Another polyurea process is disclosed in Jabs et al., U.S. Pat. No. 4,428,978, employing as the isocyanate reactant an isocyanurate-modified aliphatic polyisocyanate. The other interfacial polymerization reactant is a "hydrogen active" compound such as an amine. The reaction occurs in the presence of a colloidal stabilizer such as polyvinylalcohol (PVA). The pH of the aqueous continuous phase is adjusted to below pH 7 immediately after adding the amine. Although agglomerate-free suspensions of microcapsules can be produced via this method, the microcapsules unfortunately exhibit unacceptable permeability to the hydrophobic core material with a consequent loss of copy-forming ability when the microcapsules are used in CCPs. The reason for this permeability is unclear, but a possible reason is that excess acid in the aqueous solution causes isocyanate groups to react excessively with the PVA during capsule-wall formation, causing too many PVA molecules to be incorporated into the microcapsule shell. If PVA is incorporated deeply and extensively into the polyurea capsule shell, microchannels extending through the shell wall can be produced due to the incompatibility of the PVA with the polyurea and because of consequent reduction of the amount of cross-linking that would otherwise occur in the capsule shell between isocyanate and amine groups. Such microchannels provide escape routes allowing passage of the core material through the capsule wall, especially during conditions of high heat and humidity, causing a reduction in impermeability.

Another reference pertaining to a polyurea capsule shell is U.S. Pat. No. 4,193,889 to Baatz et al., disclosing microcapsules formed via a polycondensation reaction between an aliphatic polyisocyanate containing at least one biuret group with a "chain-extending agent" such as a polyamine. Unfortunately, this method is only capable of producing relatively low concentrations (about 10% w/w or less) of microcapsules without agglomeration. Also, the microcapsules produced by this method lack sufficient stability for producing satisfactory CCPs.

Yet another reference pertaining to polyurea microcapsules is U.S. Pat. No. 4,668,580 to Dahm et al., disclosing a continuous polyaddition process involving isocyanates that are insoluble in the hydrophobic phase. This method suffers from the disadvantage that at least some degree of solubility of the isocyanate in either the hydrophobic phase or the aqueous phase is required to achieve satisfactory interfacial polymerization. If, as taught in this reference, the isocyanate is insoluble in both the hydrophobic phase and the aqueous phase, interfacial polymerization would be unpredictable in its outcome and would produce microcapsules of a quality unacceptable for use in CCP.

Yet another reference is U.S. Pat. No. 4,785,048 to Chao disclosing interfacial polyaddition of aliphatic or aromatic polyisocyanates or polyisocyanate-epoxy reagents with polyamines to form polyurea microcapsules. High concentrations of colloidal stabilizers and surfactants are used in attempts to inhibit agglomeration and improve impermeability of the capsule wall. Also, both a stabilizer (such as PVA) and a surfactant (such as condensed naphthalene sulfonate) are present during the emulsification step, where the stabilizer is present in a lower concentration than the surfactant. Unfortunately, the microcapsules produced by this process can exhibit high permeability to core material if high amounts of stabilizer are used during capsule manufacture. At the same time, microcapsules can agglomerate during heat curing unless sufficient stabilizer is included.

Hence, there remains a need for a process that will yield agglomerate-free suspensions of polyurea microcapsules, even at high concentrations of microcapsules such as 50 and 60% w/w, that do not undergo agglomeration even when subjected to high temperature after formation of the microcapsules.

There also remains a need for such a process yielding polyurea microcapsules suitable for CCP use, where the microcapsules exhibit a high degree of impermeability to the hydrophobic "core material" such as a organic solution of CCP dye or dye-precursor, even during extended storage at elevated temperature and humidity.

There is also a need for CCP polyurea microcapsules that break easily upon application of a normal writing or printing force to paper coated with a suspension of the microcapsules, but have a high resistance to breaking during normal handling and storage conditions.

There is also a need for a process for manufacturing polyurea microcapsules that does not require the use of toxic aliphatic diisocyanates as an isocyanate reactant.

SUMMARY OF THE INVENTION

In accordance with the present invention, polyurea microcapsules usable for carbonless copy paper and a wide variety of other applications can be produced that meet the "seven criteria" listed hereinabove. Microcapsule production is via an interfacial polyaddition process in which a polyisocyanate is added to a hydrophobic liquid core material to form a substantially hydrophobic liquid phase. The hydrophobic phase is added to an aqueous continuous phase including a colloidal stabilizer and emulsified to form an emulsion of liquid microdroplets suspended in the aqueous phase. To form a polyurea shell around each microdroplet, a polyamine soluble in the aqueous phase and a catalytic amount of an alkaline base soluble in the aqueous phase are added to the microdroplet suspension, yielding a suspension of microcapsules. As an optional step, the suspension of microcapsules can be heated for a period of time to cure the polyurea.

The alkaline base is selected from a group consisting of hydroxides of alkali metals, such as NaOH, KOH, and LiOH. The concentration of alkaline base constituting the "catalytic amount" is within a range of about 0.001 to about 0.50% w/w relative to the mass of the hydrophobic phase, preferably within the range of about 0.02 to about 0.20% w/w. In any event, the amount of added alkaline base is sufficient to confer an alkaline pH to the suspension. The catalytic amount of alkaline base is believed to induce reaction of isocyanate and hydroxyl group of the colloidal stabilizer thereby effecting an unexpected improvement in capsule suspension stability through heat curing producing high solids capsule suspensions without agglomeration.

Two embodiments are disclosed. In the first embodiment, essentially as described above, the alkaline base is added to the suspension at about the time of initiating the wall-forming reaction between the polyisocyanate and the polyamine. In the first embodiment, the colloidal stabilizer is a polyhydroxylated water-soluble polymeric emulsifier, such as polyvinylalcohol and related compounds. The yield of microcapsules via the first embodiment is up to about 50% w/w without an unacceptable degree of agglomeration.

In the second and preferred embodiment, the catalytic amount of the alkaline base is added along with a water-soluble surfactant to the suspension after the initial wall-forming reaction has begun. The surfactant, acting in conjunction with the alkaline base, is believed to further control the amount and manner of incorporation of the colloidal stabilizer into the polyurea matrices. As a result, microcapsules produced by the process of the second embodiment possess impermeability and high-temperature tolerance characteristics that appear to be even better than results obtainable with the first embodiment. Further, the maximum yield of microcapsules via the second embodiment is about 60% w/w without agglomeration.

The surfactant used in the second embodiment is selected from a group of compounds including condensed naphthalene sulfonates and sodium dodecyl benzenesulfonate salt. The surfactant is added to a concentration in the suspension of about 0.1 to about 3.0% w/w relative to the mass of the hydrophobic phase, preferably within the range of about 0.30 to about 2.0% w/w.

In the second embodiment, the colloidal stabilizer can be selected not only from polyhydroxylated water-soluble polymeric emulsifiers as in the first embodiment, but also can be a non-hydroxylated compound such as polyvinylpyrrolidone.

In either embodiment, the polyisocyanate is preferably an isocyanurate-modified or biuret-modified triisocyanate of an alkyl diisocyanate. However, other polyisocyanates may also be used. The preferred polyamine is diethylenetriamine (DETA). However, other polyamines may also be used, based on the known chemistry of polyurea syntheses. The polyamine is preferably present in a stoichiometric ratio relative to the concentration of isocyanate groups.

Microcapsule suspensions produced by multiple examples of the first and second embodiments were individually applied to paper surfaces in a manner normally employed in the art for making CCPs. Each was then tested and found to conform to the "seven criteria" listed hereinabove.

DETAILED DESCRIPTION

The present invention is based upon the discovery that polyurea microcapsules satisfying the "seven criteria" for use in CCP can be produced using aliphatic isocyanates and polyamines as polymerization reactants, including a colloidal stabilizer in the aqueous continuous phase, adding surfactant (if at all) only after the initial formation of the microcapsule shell, and adding a small amount of a water-soluble alkaline base during formation of the microcapsule shell to control the amount of stabilizer incorporated into the capsule shell. As a result, microcapsules produced by a process according to the present invention have enhanced stability in aqueous suspension, even at high concentration, improved impermeability characteristics, and other attributes representing an improvement over polyurea microcapsules currently known in the art.

The present invention is founded on biuretized or isocyanurate-modified polyisocyanates based on lower ($C_1$-$C_6$) alkyl diisocyanates. Procedures for the synthesis of such modified polyisocyanates are known in the art.

A representative biuretized polyisocyanate monomer based on hexamethylene-1,6-diisocyanate (HMDI) has the structure:

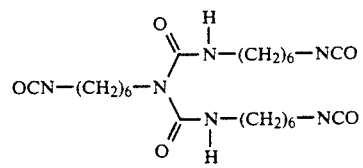

This compound is obtainable from Mobay ("N-100", "N-3200") and from Rhone-Poulenc ("HDB").

A representative isocyanurate-modified polyisocyanate monomer based on HMDI has the structure:

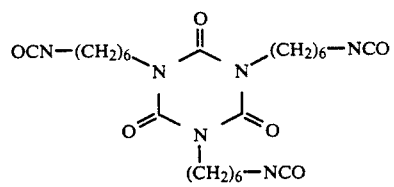

This compound is obtainable from Mobay ("N-3300") and from Rhone-Poulenc ("HDT").

As can be seen, both the above polyisocyanates are actually "triisocyanates" because each molecule has three isocyanate groups. Although the compounds above are shown having six-carbon arms, the length of the arms can vary from one to six carbons, preferably from four to six carbons.

Of the two types of polyisocyanates, the isocyanurate-modified type is preferred over the biuretized monomer because the biuretized monomer tends to be less stable as a monomer and has greater viscosity than the isocyanurate-modified type. In any event, either type of polyisocyanate monomer can be used, either alone or in combination with the other.

In addition, most, if not all, polyfunctional aliphatic isocyanates known in the art for forming polyurea would be suitable, based on the simple fact that this general class of isocyanates has multiple terminal isocyanate groups available to participate in polyurea-forming reactions with a polyamine. Other isocyanates that would work include 4,4'-diisocyanatodicyclohexylmethane and related compounds.

The general scheme of the process of the present invention is as follows: The polyisocyanate reactant is added to a volume of a liquid hydrophobic core material such as an organic solution of dye precursor suitable for use in CCP, forming a substantially hydrophobic liquid phase. The polyisocyanate need not be completely soluble in the core material, but at least partial solubility is required. The hydrophobic liquid phase is added to an aqueous continuous phase which includes a small amount of at least one dissolved colloidal stabilizer compound, yielding an immiscible mixture of the two phases. Emulsification of the mixture is performed using some form of agitation known in the art to form discrete, substantially uniformly sized microdroplets of the hydrophobic phase suspended in the aqueous continuous phase. The colloidal stabilizer dissolved in the aqueous phase stabilizes the emulsion; i.e., it keeps the microdroplets in the aqueous continuous phase in suspension and separated from one another. An alkaline base soluble in the aqueous continuous phase is subsequently added to the emulsion. The small amount of alkaline base serves to promote a limited number of bonding reactions between colloidal stabilizer molecules and polyisocyanate molecules. The limited number of linked polyisocyanate-stabilizer molecules later become incorporated into polyurea microcapsule shells. To form the polyurea shells, a polyamine soluble in the aqueous phase and reactive with the polyisocyanate is added to the emulsion. Upon adding the polyamine, a polyurea shell forms around each microdroplet via polyaddition reactions at the spherical interface between the microdroplet and the aqueous continuous phase. After polymerization, the microcapsule suspension can be thermally cured, if required, for greater impermeability and capsule strength.

The process outlined above can be readily performed either as a batch process or as a continuous process.

Core material for use in CCP is preferably a leuco dye in hydrophobic solution. (A "leuco" dye is an example of a "dye precursor." A leuco dye is any compound from a group of colorless dye derivatives that, upon oxidation, is converted into the colored dye.) For CCPs, leuco dyes are preferred over dyes because leuco dyes are colorless. This allows CCPs to be produced having substantially invisible transfer coatings. If a microencapsulated dye were used, any areas on the paper coated with a transfer coating would be the color of the dye, which is generally considered undesirable. Also, CCPs made using leuco dye microcapsules and having transfer coatings and developer coatings on separated sheets will not generate further markings once the individual sheets have been separated, even if more microcapsules are inadvertently ruptured. Suitable dye precursors include triphenylmethanes, diphenylmethanes, xanthenes, thiazines, and spiropyrane compounds.

Other core materials may be microencapsulated for non-CCP use, including virtually any water-immiscible (hydrophobic) liquid organic substance or solution. For example, the core material may be selected generally from a group comprising aliphatic hydrocarbons, chlorinated aliphatics, alicyclic hydrocarbons, chlorinated alicyclics, aromatic hydrocarbons, and chlorinated aromatics. Other possible solutes comprising the core material may be any from a wide variety of compounds and substances, including plant protection agents such as insecticides, herbicides, or fungicides; perfumes; flavors; food products; colorants; paints; catalysts; and nutritional formulations for plants or animals. Hydrophobic dyes and dye precursors for applications other than CCP can also be microencapsulated.

Suitable hydrophobic solvents for dissolving leuco dyes for use in CCP include aromatic hydrocarbons, phthalate esters, chlorinated paraffins, alkylnaphthalenes, alkylated biphenyls, substituted diphenylmethanes, substituted diphenylethanes, and partially hydrogenated terphenyls. These solvents are characterized not only by their hydrophobicity but also by their high boiling points (greater than 100° C.).

The hydrophobic solvent may be further diluted with a "diluent" selected from a group comprised of kerosenes, n-paraffins, and isoparaffins. These diluents also have high boiling points and marked hydrophobicity.

To form the emulsion of microdroplets of the hydrophobic phase in the aqueous continuous phase, dispersion devices known in the art capable of generating a shear gradient are generally used. The intensity of the turbulence generated during mixing is the major factor determining the diameter of the microdroplets. It is possible via such agitation to produce substantially uniformly sized spherical microdroplets having diameters ranging from about 1 to about 1000 micrometers. Microcapsules having diameters within a range of about 2 to about 20 micrometers are preferred for CCPs. During dispersion, virtually all the hydrophobic phase is converted into microdroplets (the "disperse" phase).

Polyamines suitable for reaction with the isocyanates listed above include aliphatic primary or secondary polyamines including ethylene diamine, hexamethylene diamine, diethylene triamine (DETA), triethylene tetraamine, tetraethylene pentaamine, or combinations of such compounds. DETA is the preferred polyamine. The amount of polyamine required is preferably in a stoichiometric relationship with the amount of polyisocyanate in the hydrophobic phase, within a deviation of about plus or minus 10%.

Suitable colloidal stabilizers, also termed "protective colloids" or "emulsifiers," include polyvinylalcohol (PVA), blends of PVA and PVAc, polyvinylpyrrolidone (PVP), carboxymethylcellulose (CMC), water soluble starches and gelatin. Other water-soluble polymers rich in hydroxyl groups can also be used. PVA is the preferred colloidal stabilizer.

The alkaline base added in "catalytic amounts" to the emulsion of microdroplets may be selected from a group comprising hydroxides of alkali metals, such as sodium hydroxide (NaOH), potassium hydroxide (KOH), and lithium hydroxide (LiOH). Each of these hydroxides is highly soluble in the aqueous continuous phase and substantially insoluble in the hydrophobic phase. The term "catalytic amount" is used to describe an amount of the hydroxide that will enhance the polymerization reaction to produce the desired microcapsule wall characteristics. The amount of hydroxide required ranges from about 0.001% to about 0.50% w/w relative to the mass of the hydrophobic phase. The preferable range is from about 0.02% to about 0.20%. In any event, the amount of hydroxide added is sufficient to insure an alkaline pH to the suspension.

Hydroxide is believed to confer its surprisingly beneficial effect by promoting the bonding of molecules of the colloidal stabilizer, such as PVA, to molecules of polyisocyanate. During the interfacial polymerization reaction, which begins upon addition of the polyamine, polyisocyanate molecules having attached stabilizer molecules become incorporated into the polyurea matrix comprising the microcapsule shell. Portions of the incorporated stabilizer molecules, however, remain extended from the microcapsule shell into the aqueous continuous phase where such portions serve to impart electrorepulsive and steric repulsive forces to the microcapsules. These repulsive forces keep the microcapsules separated from one another in suspension, thereby preventing formation of agglomerations. Since the stabilizer molecules are covalently bound to the microcapsules, they remain attached thereto, even under harsh conditions such as increased temperature, vigorous mechanical agitation, and downstream process steps such as preparation of a transfer coating slurry for application to a paper surface to form CCP.

If stabilizer molecules were not covalently bound to the microcapsules, they would at best be only adsorbed on the surface of the microcapsules. Such adsorbed stabilizer molecules can be readily desorbed and redistributed in a suspension, which can result in destabilization and consequent agglomeration. Hence, chemically bound stabilizers are more effective in stabilizing aqueous suspensions of minute particles such as microcapsules.

The small amount of hydroxide promotes the bonding of only a relatively small portion of the colloidal stabilizer molecules with polyisocyanate molecules. Too much incorporated stabilizer, such as PVA, into the capsule wall causes the formation of PVA-rich discontinuities in the polyurea matrix. These discontinuities can function as "microchannels" extending through the capsule wall through which core material can pass, especially during elevated temperature conditions. Our experiments have shown that excess PVA incorporation results in microcapsules exhibiting unacceptably high permeability to core material during thermal postcuring, during drying of a CCP transfer coating after application to a paper surface, or during subsequent elevated-temperature storage of the CCP.

The wall-forming polyaddition reaction essentially occurs in two stages. In the first or "initial wall-forming" stage, the polyamine added to the emulsified suspension of microdroplets in the presence of colloidal stabilizer and a "catalytic amount" of a water-soluble alkaline base undergoes a polyaddition reaction at the interface between each hydrophobic microdroplet and the aqueous continuous phase. In this stage, a substantial amount of the available isocyanate and amino groups on the monomers react within the first few minutes. The products of such a polymerization reaction comprise a suspension of polyurea microcapsules in the aqueous continuous phase.

In the optional second stage, also termed a "curing" stage or "thermal post-treatment" stage, the microcapsule suspension is heated to accelerate reaction, as well as crosslinking, between remaining isocyanate and amino groups in the polyurea shells. In general, most of these crosslinks would form anyway over a long period of time in the absence of a curing stage. A curing stage generally speeds up the process.

Curing confers several advantages: First, it serves to rapidly exhaust the supply of unreacted polyisocyanates or polyamines in the suspension. This eliminates potential interference of unreacted monomers with the core material when the microcapsules are deliberately ruptured, such as when writing on a CCP form. Second, curing serves to increase the thickness of the microcapsule walls to a desired level, ensuring that, for example, microcapsules destined for use in CCP have the requisite resistance to handling forces but rupture easily upon application of a writing or printing force. Third, curing tends to rapidly "tighten" the polyurea matrix comprising the microcapsule shells so that they quickly reach a maximal impermeability to the core material, thereby rendering microcapsules used in CCP more capable of withstanding prolonged storage while maintaining good copy-forming ability.

Although such curing is necessary when manufacturing microcapsules for use in CCPs, other end-uses for microcapsules made according to the present invention may not require curing.

Thermal post-treatment is a relatively aggressive step, especially when performed on freshly formed microcapsules. In many of the prior-art methods cited hereinabove, thermal post-treatment causes agglomeration of newly formed microcapsules. Apparently, those prior-art methods yield microcapsules that have a lower threshold to a critical stage, termed a "sticky stage" in the art, beyond which suspension particles tend to agglomerate. This threshold is typically represented as a temperature or concentration limit. Agglomeration of a suspension, which generally renders the preparation useless, upon merely increasing the temperature is a rather dramatic illustration that a suspension of microcapsules does not have a requisite degree of stability. The "sticky stage" of the process of the present invention, in contrast, is appreciably higher than prior-art methods, permitting higher microcapsule concentrations to be consistently obtained without agglomeration, when subjected to thermal post-treatment. In fact, agglomeration has not been seen to occur even in cured suspensions containing as much as 60% w/w microcapsules.

In addition to high stability, microcapsules made according to the present invention also have a narrow particle size distribution.

In a first embodiment of the process of the present invention, the catalytic amount of the water-soluble alkaline base is added to the aqueous continuous phase either before, during, or just after beginning the initial wall-forming reaction. I.e., the alkaline base can be added to the aqueous phase either before or after formation of the emulsion of microdroplets in the aqueous continuous phase. The alkaline base may also be added to the aqueous solution containing the polyamine, in which case the base is present at the onset of the initial wall-forming reaction.

In the first embodiment, the colloidal stabilizer is a compound possessing multiple hydroxyls on each molecule. I.e., the colloidal stabilizer is a water-soluble polymer containing a number of functional hydroxyl groups located either on the polymer backbone or on other functional groups bonded to the polymer backbone. Examples of such compounds include polyvinylalcohol (PVA), polyvinylalcohol-polyvinylacetate blends, hydroxyethyl cellulose, carboxymethyl cellulose and similar hydroxyl-rich compounds.

In a second and preferred embodiment, the catalytic amount of the water-soluble alkaline base is added to the aqueous phase along with a specific amount of a "surfactant", or surface-active agent, after the initial wall-forming reaction is initiated. As in the first embodiment, the initial wall-forming reaction begins almost immediately upon addition of the aqueous solution containing the polyamine. The preferable amount of alkaline base added is the same as in the first embodiment. Preferred surfactants are those possessing multiple sulfonate or sulfonate/sulfate groups. The amount of surfactant can range from about 0.10% to about 3% based upon the mass of the hydrophobic phase. The preferable range is from about 0.30% to about 2.0%.

Representative suitable surfactants include any compound from the group consisting of condensed naphthalene sulfonates and sodium dodecyl benzenesulfonate salt (such as SIPONATE DS-10 manufactured by Alcolac). Examples of condensed naphthalene sulfonates include TAMOL SN and TAMOL L manufactured by Rohm and Haas.

The surfactant serves several important functions. First, it imparts additional electrorepulsive and steric repulsive forces to the microcapsules which further aid stability. Second, the surfactant helps to further improve the impermeability characteristic of the microcapsules, probably by altering the manner in which stabilizer molecules are incorporated into capsule walls.

In either embodiment, the polyaddition reaction may be conducted in a different vessel than the one used for formation of the emulsion of the microdroplets.

Typically, the polyaddition reaction ("initial wall-forming" stage) is conducted at a temperature within a range of about 15° C. to about 40° C. for a time period ranging from several minutes to several hours. The "thermal post-treatment" stage, if required, is conducted at a temperature within the range of about 40° C. to about 70° C. for a period of several hours.

Progress of the interfacial polyaddition reaction can be monitored by tracking the loss of free isocyanates in the suspension.

Either embodiment of the process of the present invention is capable of producing high concentrations of microcapsules (concentrations of microcapsules are sometimes expressed in the art as "percent solids"). The maximum percent solids obtainable using the process of the first embodiment is about 50% w/w without agglomeration. The second embodiment is capable of producing about 60% w/w without agglomeration. For making CCPs using current methods, the concentration of microcapsules should be within the range of about 30 to 50 percent solids, where about 40 percent seems to be the practical limit for most current processes due to excessive viscosity of certain higher percent solids suspensions. However, if the suspension is to be dried before use, higher achievable concentrations are desired because of the greater economy in having to remove lesser amounts of water.

Coatings containing microcapsules suitable for use in making CCP may be produced from a suspension of microcapsules produced according to the present invention by known methods. In brief, a binder is added to the suspension of microcapsules. Optionally, inert filler materials can also be added such as granulated wheat starch or talc. The resulting slurry can be applied to a paper surface either manually with, for instance, a wire-wound rod or by a coating machine equipped with, for example, an air knife. Generally, such coatings are applied in an amount ranging from about 3 to about 8 g/m$^2$. Papers thus coated contain the first color-forming component termed the "transfer layer."

In the manufacture of CCP, suitable dye developers include oxidizers such as acid clays and synthetic phenolic resins. In most CCP transaction forms comprising multiple sheets, the "transfer layer" is located on the underside of the top sheet. The corresponding upper surface of the underlying sheet is then coated with a layer containing the dye developer which is known in the art as the "receiver component." The production of receiver components containing dye developers is known in the art.

The following examples are included as representative illustrations of the present invention and should not be considered to limit the scope thereof.

EXAMPLE 1

The following is an example of the first embodiment:

A hydrophobic solution of core material was prepared by dissolving 8.4 grams of crystal violet lactone in 201.6 grams of sec-butyl biphenyl (a hydrophobic solvent) with heating. After cooling, 90 grams of $C_{10}$–$C_{12}$ isoparaffin oil were added as a diluent with stirring until a clear solution was obtained. To this solution was added, with stirring, 24.5 grams "HDT," an isocyanurate trimer manufactured by Rhone-Poulenc. The resulting concentration of isocyanate was 7.5% based on the total mass of solvent plus diluent. The resulting solution constituted the "hydrophobic phase."

The hydrophobic phase was added to 500 grams of a 0.55% aqueous solution of PVA and emulsified using a homogenizer to form an emulsion of microdroplets with an average diameter of about 7 micrometers. A solution consisting of 4.4 grams diethylenetriamine (DETA), 0.16 gram NaOH, and 43.44 grams deionized water was added to the microdroplet emulsion with stirring. The resulting concentration of NaOH was 0.05% w/w based on the weight of the hydrophobic phase. Also, the mass of DETA added represented a stoichiometric amount relative to the molar amount of isocyanate groups in the hydrophobic phase. After adding the amine, the suspension was stirred for one hour at 40° C. while the microcapsule shells formed around the microdroplets. To cure, the microcapsule suspension was heated with stirring at 60° C. for three hours. The concentration of microcapsules in the suspension was 38% w/w with no evidence of agglomeration. The suspension was tested as described below after Example 5.

EXAMPLE 2

The following is an example of the second embodiment:

The hydrophobic phase was prepared as in Example 1 using 8.4 grams crystal violet lactone, 201.6 grams sec-butyl biphenyl, 90 grams $C_{10}$–$C_{12}$ isoparaffin and 24.5 grams of HDT isocyanurate trimer.

The hydrophobic phase was emulsified in 500 gms of 0.55% aqueous PVA solution to an average microdroplet diameter of 7 micrometers. Afterward, a solution of 4.4 grams DETA (stoichiometric with respect to the isocyanate) in 39.6 grams deionized water was added with stirring. Again, the DETA was present in a stoichiometric ratio relative to the isocyanate. Then, a solution of 2 grams TAMOL SN and 0.16 gram NaOH in 5.84 grams water was added, yielding a w/w percent of TAMOL SN relative to the mass of the hydrophobic phase of 0.62% w/w. The suspension was stirred for one hour at 40° C., then at 60° C. for three hours. Microcapsule yield was 38% w/w. The suspension was tested as described below after Example 5.

EXAMPLE 3

This example is similar to Example 1 except that the alkaline base was omitted from the aqueous solution of DETA. As a result, this example simulates the teachings of Baatz et al., U.S. Pat. No. 4,193,889. This example was executed for comparative testing purposes.

A hydrophobic phase was prepared as described in Example 1 using 8.4 grams crystal violet lactone, 201.6 grams sec-butyl biphenyl, 90 grams of $C_{10}$–$C_{12}$ isoparaffin and 24.5 grams of HDT.

The hydrophobic phase was emulsified in an aqueous 0.55% PVA solution to an average microdroplet diameter of 7 micrometers, as in Example 1. A solution of 4.4 grams DETA (stoichiometric relative to the isocyanate) in 39.6 grams deionized water was then added with stirring. The suspension was stirred for one hour at 40° C. and at 60° C. for three hours. The suspension agglomerated severely soon after beginning the 60° C. curing step and was unusable.

EXAMPLE 4

This example is similar to Example 1 except that the alkaline base was omitted from the aqueous solution of DETA and the pH of the suspension was rendered acidic after initiating the interfacial polyaddition reaction, according to the teachings of Jabs et al., U.S. Pat. No. 4,428,978. This example was executed for comparative testing purposes.

A hydrophobic phase was prepared as described in Example 1.

The hydrophobic phase was emulsified in an aqueous 0.55% PVA solution to an average microdroplet diameter of 7 micrometers, as in Example 1. A solution of 4.4 grams DETA in 39.6 grams deionized water was then added with stirring. After stirring, the suspension was adjusted to pH 6.9 using about 60 grams of 1N HCl. After stirring for one hour at 40° C., the suspension was heated to 60° C. for three hours with stirring. Microcapsule yield was 35.5% w/w. The suspension was tested as described below after Example 5.

EXAMPLE 5

This example is similar to Example 1 except that the alkaline base was omitted from the aqueous amine solution. Ethylene diamine was used as the amine, according to the teachings of Vivant, U.S. Pat. No. 4,738,898. This example was executed for comparative testing purposes.

A hydrophobic phase was prepared as described in Example 1.

The hydrophobic phase was emulsified in an aqueous 0.55% PVA solution to an average microdroplet diameter of 7 micrometers, as in Example 1. A solution of 4.62 grams ethylenediamine (20 percent over a stoichiometric ratio relative to the isocyanate) in 41.6 grams deionized water was then added with stirring to the emulsion. After stirring for one hour at 40° C., the suspension was heated to 60° C. for three hours with stirring. Microcapsule yield was 38% w/w. Some evidence of thickening, indicating partial agglomeration, was noted.

Testing of the products of each of Examples 1-5 was conducted to determine qualities thereof relating to the requirements for CCP microcapsules as listed hereinabove. Test results are tabulated in Table I.

First, the suspensions from each example were examined visually and under optical magnification for agglomeration in order to assess how well the suspensions conformed to the first of the "seven criteria". Each suspension was rated on a scale of 0 to 5 where "0" represented no agglomeration and "5" represented heavy agglomeration. Results are shown in the "Agglom." column in Table I.

Second, the microcapsule suspensions were evaluated with respect to the first and fifth of the "seven criteria". A sample of the microcapsule suspension from each example (except Example 3) was individually applied as a "transfer" coating using a wire-wound rod to a surface of a paper used to manufacture CCP. The paper had previously been coated on the same surface with a dye-developer layer. Paper sheets treated in this manner were evaluated for discoloration by measuring the loss of reflectance versus a "control" sheet of paper lacking the transfer coating. A Bausch & Lomb Opacimeter instrument manufactured by Diano adjusted for reflectance was used to determine percent reflectance measurements. The coated papers were then placed for fifteen minutes, in the absence of light, in a 100° C. oven. Afterward, the coated papers were again subjected to reflectance measurements to test for any loss of reflectance due to discoloration. The final results were compared with the original reflectance measurements and shown in the "100° C., 15 min" columns in Table I. A 100% reflectance represents no image intensity and 0% represents maximal image intensity.

Third, in order to evaluate conformance to the second of the "seven criteria", a mixture was prepared of each capsule suspension (except for Example 3) which included a binder compound and a wheat starch, according to formulations known in the art for making CCPs. The mixtures were individually coated using a wire-wound rod onto raw paper at a coating weight of 5.3 g/m² to simulate formation of a CCP transfer sheet. The coated sheet surfaces were then individually scuffed against the surface of a commercially available CCP "receiver" sheet (having a dye-developer coating) using an apparatus designed to simulate the treatment experienced when CCP paper is handled. Each receiver sheet was subsequently examined for coloration (loss of reflectance) as described above. Results are shown in the "Scuff" column of Table I.

Fourth, as a further evaluation of the first of the "seven criteria", further "transfer sheets" each coated individually with a microcapsule suspension from Examples 1, 2, 4, and 5, as described above, were placed coated side down on a conventional CCP "receiver" sheet having a dye-developer coating on its upper surface. Each paired set of sheets was calendered using an apparatus adjusted to simulate the pressure applied when writing on a CCP sheet. The resultant copy on the receiver sheet was examined for coloration as described above. Results are shown in the "Copy Intensity" column of Table I.

Fifth, further "transfer sheets" prepared as described above were placed in a 60° C., 75% relative humidity environment for 7, 14, and 21 days, respectively. Each sheet was examined for percent reflectance, as described above, both before and after incubation. Post-incubation readings were compared to original readings and recorded as a percentage of original reflectance lost. Results are shown in Table I in the three columns corresponding to the "60° C." heading. This test was an evaluation of the sixth of the "seven criteria".

Sixth, further "transfer sheets" prepared as described above were placed in a 70° C., 75% relative humidity environment for 3, 6, and 12 days, respectively. Each sheet was examined for percent reflectance as described above, both before and after incubation. Post-incubation readings were compared to original readings and recorded as a percentage of original reflectance lost. Results are shown in Table I in the three columns corresponding to the "70° C." heading. This test was also an evaluation of conformance to the sixth of the "seven criteria".

TABLE I

| Example | Agglom. | 100° C., 15 min[A] Before | 100° C., 15 min[A] After | Scuff[B] | Copy Intensity[C] | 60° C.[D] 7d | 60° C.[D] 14d | 60° C.[D] 21d | 70° C.[D] 3d | 70° C.[D] 6d | 70° C.[D] 12d |
|---|---|---|---|---|---|---|---|---|---|---|---|
| 1 | 0 | 98.2% | 96.2% | 92.7% | 21.8% | 0.7 | 0.2 | 0.1 | 33.2 | 77.9 | 100.0 |
| 2 | 0 | 97.8% | 95.1% | 91.9% | 21.3% | 0.7 | 0.5 | 0.0 | 1.7 | 1.1 | 2.4 |
| 3 | 5 | — | — | — | — | — | — | — | — | — | — |
| 4 | 0 | 98.0% | 93.9% | 82.6% | 21.5% | 2.8 | 3.3 | 3.3 | 100.0 | 100.0 | 100.0 |

TABLE I-continued

| Example | Agglom. | 100° C., 15 min[A] Before | 100° C., 15 min[A] After | Scuff[B] | Copy Intensity[C] | 60° C.[D] 7d | 60° C.[D] 14d | 60° C.[D] 21d | 70° C.[D] 3d | 70° C.[D] 6d | 70° C.[D] 12d |
|---|---|---|---|---|---|---|---|---|---|---|---|
| 5 | 1 | 90.6% | 91.7% | 93.1% | 24.5% | 5.5 | 16.1 | 37.6 | 100.0 | 100.0 | 100.0 |

[A] Percentages denote % reflectance. The lower the percentage, the greater the discoloration.
[B] Percentages denote % reflectance. The lower the percentage, the greater the discoloration.
[C] Percentages denote % reflectance. The lower the percentage, the more the color intensity of the copy.
[D] Numbers denote loss of % reflectance. The lower the number, the lesser the decrease in reflectance.

Table I clearly shows that CCP transfer sheets made using microcapsules according to first and second embodiments of the present invention, respectively, had superior properties in comparison to transfer sheets made using microcapsules prepared according to several widely used methods in the art. CCP transfer sheets comprising microcapsules made according to the present invention exhibited the following characteristics: (1) no agglomeration of microcapsules, even after three hours' thermal curing; (2) negligible leakage of core material after 15 minutes at 100° C., indicating that the microcapsules are capable of surviving a drying step after application as a transfer coating to paper; (3) excellent scuff resistance, indicating that CCPs made using these microcapsules are resistant to forces imparted thereto from normal packaging, transportation, and handling; (4) excellent copy intensity; and (5) a greater resistance to loss of impermeability induced by prolonged high-temperature exposure than prior-art CCPs. Table I also shows that CCP made per Example 2, in which microcapsules made according to the second embodiment were used, has superior resistance to high-temperature induced loss of capsule-wall impermeability than CCP made per Example 1. This indicates that a combination of a catalytic amount of a water-soluble alkaline base during the initial wall-forming reaction plus a sulfonate surfactant added just after completion of the initial wall-forming reaction forms microcapsules that are superior, at least for CCP purposes, over the first embodiment and over any comparable prior-art method.

EXAMPLE 6

In this example, microcapsules were made using the process of the first embodiment where hydroxyethyl cellulose was used as the colloidal stabilizer instead of PVA.

A hydrophobic phase was prepared as described in Example 1 using 8.4 grams crystal violet lactone, 201.6 grams sec-butyl biphenyl, 90 grams $C_{10}$–$C_{12}$ isoparaffin, and 24.5 grams of the isocyanurate trimer HDT.

The hydrophobic phase was emulsified in an aqueous 0.75% solution of hydroxyethyl cellulose to an average microdroplet diameter of 6.6 micrometers as in Example 1. A solution of 4.4 grams DETA in 39.5 grams deionized water was then added with stirring. Shortly afterward, a solution of 0.16 grams NaOH in 5.84 grams water was added. The suspension was stirred for one hour at 40° C. and at 60° C. for three hours. The suspension was tested as described below after Example 7.

EXAMPLE 7

In this example, microcapsules were made using the process of the first embodiment except that the colloidal stabilizer lacked hydroxyl groups.

A hydrophobic phase was prepared as described above in Example 1.

The hydrophobic phase was emulsified in an aqueous 0.75% solution of polyvinylpyrrolidone solution to an average microdroplet diameter of 7 micrometers, as in Example 1. A solution of 4.4 grams DETA, 0.16 gram NaOH, and 43.44 grams deionized water was then added with stirring. After stirring for one hour at 40° C. for one hour, the suspension was heated to 60° C. for three hours with stirring. The suspension became severely agglomerated soon after heating to 60° C. and was unusable.

Testing of the products of each of Examples 6 and 7 was conducted and compared with the test results of the products of Examples 1 and 3. The tests were as described above in relation with Table I except that an extended incubation at 70° C. was not performed. Test results are shown in Table II.

TABLE II

| Example | Agglom. | 100° C., 15 min[A] Before | 100° C., 15 min[A] After | Scuff[B] | Copy Intensity[C] | 60° C.[D] 7d | 60° C.[D] 14d | 60° C.[D] 21d |
|---|---|---|---|---|---|---|---|---|
| 1 | 0 | 98.2% | 96.2% | 97.7% | 21.8% | 0.7 | 0.2 | 0.1 |
| 3 | 5 | — | — | — | — | — | — | — |
| 6 | 0 | 98.2% | 88.6% | 89.5% | 23.1% | 1.2 | 0.5 | 0.9 |
| 7 | 5 | — | — | — | — | — | — | — |

[A,B,C,D] See Table I

Table II shows that the substitution of an alternative polyhydroxylated colloidal stabilizer such as hydroxyethyl cellulose (HEC) (Example 6) for PVA (Example 1) results in a negligible effect on desired properties of microcapsules made according to the first embodiment. HEC appears to cause a slight decrease in ability of the microcapsules to survive 100° C. for 15 minutes, a slightly decreased ability to survive 60° C. for extended periods. Hence, while it is concluded from these results that PVA is the preferred colloidal stabilizer, other polyhydroxylated stabilizers such as HEC yield microcapsules that are excellent for CCP use and are superior to microcapsules made using known methods in the art. (Compare, for example, the data for Examples, 3, 4, and 5 in Table I with corresponding data for Example 6 in Table II.)

Table II also shows that substitution of a non-polyhydroxylated colloidal stabilizer (Example 7) in the first-embodiment process for a polyhydroxylated colloidal stabilizer (Example 1) yields heavily agglomerated microcapsules that are non-usable. Hence, it is concluded that only polyhydroxylated colloidal stabilizers can be used with the first-embodiment process.

EXAMPLE 8

In this example, microcapsules were made using the process of the second embodiment, except that the colloidal stabilizer lacked hydroxyl groups.

A hydrophobic phase was prepared as described in Example 1.

The hydrophobic phase was emulsified in an aqueous 0.75% solution of polyvinylpyrrolidone solution to an average microdroplet diameter of 5.3 micrometers as described in Example 1. A solution of 4.4 grams DETA in 39.6 grams deionized water was then added with stirring. Shortly after adding the DETA solution, a solution of 2 grams TAMOL SN and 0.16 gram NaOH in 5.84 grams water was added to the suspension. After stirring for one hour at 40° C., the suspension was heated to 60° C. for three hours with stirring. The suspension was tested as described below after Example 9.

EXAMPLE 9

In this example, microcapsules were made using the process of the second embodiment, except that a sodium dodecyl benzenesulfonate salt (SIPONATE DS-10) was used as the surfactant instead of TAMOL SN.

A hydrophobic phase was prepared as described in Example 1.

The hydrophobic phase was emulsified in an aqueous 0.55% PVA solution to an average microdroplet diameter of 7 micrometers, as in Example 1. A solution of 4.4 grams DETA in 39.6 grams deionized water was then added with stirring. One hour after adding the DETA solution, a solution of 2 grams SIPONATE DS-10 and 0.16 gram NaOH in 5.84 grams water was added to the suspension. After stirring for one hour at 40° C. for one hour, the suspension was heated to 60° C. for three hours with stirring.

Testing of the products of each of Examples 8 and 9 was conducted and compared with the test results of Examples 1 and 2. The tests were as described above in relation to Table I except that extended incubations at 60° C. were not performed. Test results are shown in Table III.

TABLE III

| Example | Agglom. | 100° C., 15 min$^A$ Before | 100° C., 15 min$^A$ After | Scuff$^B$ | Copy Intensity$^C$ | 70° C.$^D$ 3d | 70° C.$^D$ 6d | 70° C.$^D$ 12d |
|---|---|---|---|---|---|---|---|---|
| 1 | 0 | 98.2% | 96.2% | 92.7% | 21.8% | 33.3 | 77.9 | 100.0 |
| 2 | 0 | 97.8% | 95.1% | 91.9% | 21.3% | 1.7 | 1.1 | 2.4 |
| 8 | 0 | 95.1% | 89.7% | 90.1% | 21.2% | 3.7 | 3.7 | 2.7 |
| 9 | 0 | 96.5% | 73.8% | 89.7% | 19.7% | 3.0 | 3.7 | 4.0 |

$^{A,B,C,D}$See Table 1

Table III shows that the process of the second embodiment yields excellent microcapsules for CCP use, even when a non-polyhydroxylated colloidal stabilizer is used (Example 8). Also, use of a surfactant other than a condensed naphthalene sulfonate (Example 9) in the second-embodiment process yields excellent microcapsules.

EXAMPLE 10

This example illustrates the high concentration of microcapsules obtainable with the first-embodiment process.

A hydrophobic phase was prepared as described in Example 1.

The hydrophobic phase was emulsified in 310 grams of an aqueous 0.75% PVA solution to an average microdroplet diameter of 7.3 micrometers. A solution of 4.4 grams DETA in 39.6 grams deionized water was then added with stirring. Shortly afterward, a solution of 0.16 gram NaOH in 5.84 grams water was added. Then, the solution was stirred for one hour at 40° C., then at 60° C. for three hours. Slight thickening was seen when the suspension reached 60° C. Microcapsule yield was 48.4% w/w. The suspension was tested as described below after Example 13.

EXAMPLE 11

This example is similar to Example 1 except that biuretized triisocyanate was used instead of the isocyanurate trimer.

The hydrophobic phase was prepared using 8.4 grams crystal violet lactone, 201.6 grams sec-butyl biphenyl, 90 grams $C_{10}$–$C_{12}$ isoparaffin, and 24.5 grams "HDB", a biuretized triisocyanate based on hexamethylene diisocyanate manufactured by Rhone-Poulenc.

The hydrophobic phase was emulsified in 500 grams of an aqueous 0.55% PVA solution to an average microdroplet diameter of 6.7 micrometers, as in Example 1. A solution of 4.4 grams DETA in 39.6 grams deionized water was then added with stirring. Shortly afterward, a solution of 0.16 gram NaOH in 5.84 grams water was added. The suspension was stirred for one hour at 40° C. for one hour and three hours at 60° C. Microcapsule yield was 37.9% w/w. The suspension was tested as described below after Example 13.

EXAMPLE 12

This example illustrates the high concentration of microcapsules obtainable using the second-embodiment process.

A hydrophobic phase was prepared using 8.4 grams crystal violet lactone, 201.6 grams sec-butyl biphenyl, 90 grams $C_{10}$–$C_{12}$ isoparaffin, and 24.5 grams of the isocyanurate trimer HDT.

The hydrophobic phase was emulsified in 180 grams of an aqueous 0.75% PVA solution to an average microdroplet diameter of 6.7 micrometers. Afterward, a solution of 4.4 grams DETA in 39.6 grams deionized water was added with stirring. Shortly afterward, a solution of 2 grams TAMOL SN and 0.16 gram NaOH in 5.84 grams water was added. The suspension was stirred for one hour at 40° C. for one hour and three hours at 60° C. Microcapsule yield was 59.7% w/w. This suspension was tested as described below after Example 13.

EXAMPLE 13

This example is similar to Example 2 except that a biuretized triisocyanate is used instead of the isocyanurate trimer.

A hydrophobic phase was prepared using 8.4 grams crystal violet lactone, 201.6 grams sec-butyl biphenyl, 90 grams $C_{10}$–$C_{12}$ isoparaffin, and 24.5 grams of "HDB", a biuretized triisocyanate based on hexamethylene diisocyanate manufactured by Rhone-Poulenc.

The hydrophobic phase was emulsified in 500 grams of an aqueous 0.55% PVA solution to an average microdroplet diameter of 7 micrometers. Afterward, a solution of 4.4 grams DETA in 39.6 grams deionized water was added with stirring. Shortly afterward, a solution of 2 grams TAMOL SN and 0.16 gram NaOH in 5.84 grams water was added. The suspension was stirred for one hour at 40° C., then at 60° C. for three hours. Microcapsule yield was 38.1% w/w. This suspension was tested along with suspensions produced in Examples 10-12 as follows.

Testing of the suspensions of Examples 10-13 was conducted as described above in relation with Table I. Test results are shown in Table IV.

TABLE IV

| Example | Agglom. | 100° C., 15 min[A] Before | 100° C., 15 min[A] After | Scuff[B] | Copy Intensity[C] | 60° C.[D] 7d | 60° C.[D] 14d | 60° C.[D] 21d | 70° C.[D] 3d | 70° C.[D] 6d | 70° C.[D] 12d |
|---|---|---|---|---|---|---|---|---|---|---|---|
| 1 | 0 | 98.2% | 96.2% | 92.7% | 21.8% | 0.7 | 0.2 | 0.1 | 33.2 | 77.9 | 100.0 |
| 10 | 1 | 98.3% | 96.2% | 90.0% | 20.4% | 1.1 | 0.2 | 0.1 | 31.2 | 72.7 | 100.0 |
| 11 | 0 | 96.5% | 94.7% | 91.4% | 21.2% | 0.9 | 1.7 | 2.4 | 37.4 | 80.2 | 100.0 |
| 2 | 0 | 97.8% | 95.1% | 91.9% | 21.3% | 0.7 | 0.5 | 0.0 | 1.7 | 1.1 | 2.4 |
| 12 | 0 | 97.9% | 96.8% | 91.6% | 21.3% | 0.2 | 0.0 | 0.4 | 1.5 | 1.7 | 2.2 |
| 13 | 0 | 98.3% | 96.2% | 90.0% | 22.4% | 0.0 | 0.6 | 0.2 | 2.7 | 3.4 | 2.1 |

[A,B,C,D]See Table I

Table IV shows that, even when "pushing" the reaction of the first embodiment to produce nearly 50% w/w microcapsules, there is no discernable degradation of process performance, including the ability to withstand prolonged exposure to 60° and 70° C. This can be seen by comparing the data for Example 10 with the data for Example 1. Slight agglomeration was observed, however, with the nearly 50% w/w suspension of Example 10. With respect to the second embodiment, "pushing" the reaction to produce a nearly 60% w/w microcapsule suspension also resulted in no discernable degradation of process performance. No agglomeration was observed with the 60% suspension.

Table IV also shows that, with respect to the first embodiment, substitution of a biuretized triisocyanate (Example 11) for the isocyanurate trimer used in Example 2 resulted in a slightly decreased ability of the microcapsules to withstand either 60° C. or 70° C. exposure. With respect to the second embodiment, substitution of a biuretized triisocyanate (Example 13) resulted in no discernable difference in the ability of the microcapsules to withstand either 60° or 70° exposure.

Other parameters such as resistance to short-term exposure to 100° C., scuff resistance, and copy intensity, remained unaffected by using biuretized triisocyanate or by pushing the reactions to yield high concentrations of microcapsules. Also, use of the biuretized triisocyanate did not adversely affect agglomeration behavior.

EXAMPLE 14

This example is similar to Example 2 except that no alkaline base was added to the suspension and the colloidal stabilizer (PVA) and the sulfonated surfactant (TAMOL SN) were present in the mixture of hydrophobic and hydrophilic phases at the time the mixture is emulsified. Combining the stabilizer and the surfactant in this manner is according to the teachings of Chao, U.S. Pat. No. 4,785,048, except that Chao requires different relative amounts of stabilizer and surfactant. This example was performed for comparison purposes.

A hydrophobic phase was prepared using 8.4 grams crystal violet lactone, 201.6 grams sec-butyl biphenyl, 90 grams $C_{10}$–$C_{12}$ isoparaffin, and 24.5 grams of "HDB", a biuretized triisocyanate based on hexamethylene diisocyanate manufactured by Rhone-Poulenc.

The hydrophobic phase was emulsified in 500 grams of an aqueous 0.55% PVA solution in which 2 grams TAMOL SN had been added to an average microdroplet diameter of 7 micrometers. A solution of 4.4 grams DETA in 39.5. grams deionized water was then added with stirring. The suspension was further stirred at 40° C. for one hour. Then, the temperature was increased to 60° C. This suspension became extensively agglomerated soon after reaching 60° C. and was unusable.

In Examples 2 and 14 above, the ratio of PVA stabilizer to TAMOL SN is about 42:58, which is outside the range taught by Chao (95:5 to 60:40) for producing usable suspensions of polyurea microcapsules. Also, the mass of PVA and TAMOL SN relative to the mass of the hydrophobic phase in Examples 2 and 14 is 1.46% w/w, which is slightly outside the range taught by Chao. (Chao teaches that "emulsifiers", which denotes both colloidal stabilizers and surfactants in that reference, should be present at 1.5 to 15% w/w based on the mass of the hydrophobic phase.) While omitting a catalytic amount of an alkaline base as in Example 14 resulted in severe agglomeration, the presence of the base as in Example 2 resulted in the production of an excellent suspension of microcapsules. In other words, the presence of a catalytic amount of an alkaline base to a capsule-forming emulsion permitted the production of polyurea microcapsules superior to any currently known in the art using amounts of colloidal stabilizer and surfactants that are outside ranges taught in the art.

Having described the principles of our invention with reference to several embodiments and multiple illustrative examples, it should be apparent to those of ordinary skill in the art that the invention may be modified in arrangement and detail without departing from such principles. We claim as our invention all such modifications as come within the true spirit and scope of the following claims.

We claim:

1. A process for preparing microcapsules containing a hydrophobic liquid core material, the process comprising:

adding to the core material a polyisocyanate at least partially soluble in the core material to form a substantially hydrophobic liquid phase;

emulsifying the hydrophobic liquid phase with an aqueous continuous phase comprising a polyhydroxylated colloidal stabilizer to form an emulsion of microdroplets of the hydrophobic liquid phase suspended in the aqueous phase; and adding to the emulsion of microdroplets (a) a polyamine soluble in the aqueous continuous phase and reactive with the polyisocyanate, and (b) either before or simultaneously with the polyamine, a catalytic amount of an alkaline base soluble in the aqueous continuous phase, so as to form a suspension in the aqueous continuous phase of microcapsules each comprising a polyurea shell surrounding a microdroplet.

2. A process for preparing microcapsules as recited in claim 1 wherein the alkaline base is selected from the group consisting of NaOH, KOH, and LiOH.

3. A process for preparing microcapsules as recited in claim 1 wherein the alkaline base is NaOH and is added to a concentration within a range of about 0.001% to about 0.50% w/w relative to the mass of the hydrophobic phase.

4. A process for preparing microcapsules as recited in claim 3 wherein the NaOH is added to the emulsion of microdroplets to a concentration within a range of about 0.02% to about 0.20% w/w relative to the mass of the hydrophobic phase.

5. A process for preparing microcapsules as recited in claim 1 wherein the colloidal stabilizer is selected from the group consisting of polyvinylalcohol, blends of polyvinylalcohol and polyvinylacetate, hydroxyethyl cellulose, and carboxymethyl cellulose.

6. A process for preparing microcapsules as recited in claim 1 wherein the polyisocyanate is selected from the group consisting of biuret triisocyanate derivatives of lower ($C_1-C_6$) alkyl isocyanates and isocyanurate triisocyanate derivatives of lower ($C_1-C_6$) alkyl isocyanates.

7. A process for preparing microcapsules as recited in claim 6 wherein the polyisocyanate is an isocyanurate derivative of hexamethylene diisocyanate.

8. A process for preparing microcapsules as recited in claim 1 wherein the polyamine is selected from the group consisting of aliphatic primary and secondary amines.

9. A process for preparing microcapsules as recited in claim 8 wherein the polyamine is selected from the group consisting of ethylene diamine, hexamethylene diamine, diethylenetriamine, triethylenetetraamine, tetraethylenepentaamine, and mixtures thereof.

10. A process for preparing microcapsules as recited in claim 1 wherein the polyamine is added to the emulsion of microdroplets in a stoichiometric amount relative to the amount of polyisocyanate within a deviation range of +/−10%.

11. A process for preparing microcapsules as recited in claim 1 including the step of heating the suspension of microcapsules to effect curing of the polyurea.

12. A process for preparing microcapsules containing a hydrophobic liquid core material, the process comprising:
adding to the core material (a) a polyisocyanate at least partially soluble in the core material to form a substantially hydrophobic liquid phase; (b) an aqueous continuous phase comprising a polyhydroxylated colloidal stabilizer; and (c) an aqueous solution comprising a catalytic amount of an alkaline base;
emulsifying the hydrophobic liquid phase with the aqueous continuous phase and the aqueous solution of base to form an emulsion of microdroplets of the hydrophobic liquid phase suspended in the aqueous continuous phase; and
adding to the emulsion of microdroplets a polyamine soluble in the aqueous continuous phase and reactive with the polyisocyanate to form a suspension in the aqueous phase of microcapsules each comprising a polyurea shell surrounding a microdroplet.

13. A process for preparing a suspension of microcapsules containing a hydrophobic liquid core material, the process comprising the steps:
adding to the core material at least one polyisocyanate to form a substantially hydrophobic liquid phase, where the polyisocyanate is selected from the group consisting of biuret triisocyanate derivatives of lower ($C_1-C_6$) alkyl isocyanates and isocyanurate triisocyanate derivatives of lower ($C_1-C_6$) alkyl isocyanates;
emulsifying the hydrophobic liquid phase with an aqueous phase comprising an aqueous solution of a polyhydroxylated colloidal stabilizer to form an emulsion of microdroplets of the hydrophobic liquid phase suspended in the aqueous continuous phase;
adding to the emulsion of microdroplets (a) a catalytic amount of an alkaline base soluble in the aqueous continuous phase and (b) a substantially stoichiometric amount, relative to the polyisocyanate, of a polyamine selected from the group consisting of aliphatic primary and secondary amines to form a suspension in the continuous phase of microcapsules each comprising a polyurea shell surrounding a microdroplet; and
curing the polyurea.

14. A process for preparing a suspension of microcapsules as recited in claim 13 wherein the polyurea is cured by heating the suspension of microcapsules to a temperature within a range of about 40° C. to about 70° C.

15. A process for preparing a suspension of microcapsules as recited in claim 13 wherein the alkaline base is selected from the group consisting of NaOH, KOH, and LiOH.

16. A process for preparing a suspension of microcapsules as recited in claim 13 wherein the alkaline base is NaOH and is added to the emulsion of microdroplets to a concentration within a range of about 0.001% to about 0.50% w/w relative to the mass of the hydrophobic phase.

17. A process for preparing a suspension of microcapsules containing a hydrophobic liquid core material, the process comprising the steps:
adding to the core material at least one polyisocyanate to form a substantially hydrophobic liquid phase, where the polyisocyanate is selected from the group consisting of lower ($C_1-C_6$) alkyl isocyanates and isocyanurate triisocyanate derivatives of lower ($C_1-C_6$) alkyl isocyanates;
emulsifying the hydrophobic liquid phase with an aqueous phase comprising an aqueous solution of a colloidal stabilizer to form an emulsion of microdroplets of the hydrophobic liquid phase suspended in the aqueous liquid phase;
adding a substantially stoichiometric amount, relative to the polyisocyanate, of a polyamine to the emulsion of microdroplets to begin an initial wall-forming reaction, where the polyamine is selected from the group consisting of aliphatic primary and secondary amines;
adding a catalytic amount of a water-soluble alkaline base and a water-soluble surfactant to the emulsion after the initial wall-forming reaction has begun, wherein the molecules of the surfactant possess multiple sulfur-containing substituent groups selected from the group consisting of sulfates and sulfonates, so as to form a suspension in the continuous phase of microcapsules each comprising a polyurea shell surrounding a microdroplet, the alkaline base serving to promote reaction between molecules of the colloidal stabilizer and molecules of the polyisocyanate to form molecules that are incorporated into the microcapsule shells; and curing the polyurea.

18. A process for preparing a suspension of microcapsules as recited in claim 17 wherein the alkaline base is selected from the group consisting of NaOH, KOH, and LiOH.

19. A process for preparing a suspension of microcapsules as recited in claim 18 wherein the alkaline base is NaOH and is added to the emulsion of microdroplets to a concentration within a range of about 0.001% to about 0.50% w/w relative to the mass of the hydrophobic phase.

20. A process for preparing a suspension of microcapsules as recited in claim 19 wherein the surfactant is selected from the group consisting of condensed naphthalene sulfonates and sodium dodecyl benzenesulfonate salt.

21. A process for preparing a suspension of microcapsules as recited in claim 20 wherein the concentration of surfactant in the suspension is within a range of about 0.01% to about 3.0% w/w relative to the mass of the hydrophobic phase.

22. A process for preparing a suspension of microcapsules as recited in claim 17 wherein the colloidal stabilizer is selected from the group consisting of polyvinylalcohol, mixtures of polyvinylalcohol and polyvinylacetate, polyvinylpyrrolidone, carboxymethyl cellulose, and hydroxymethylcellulose.

23. A process for preparing microcapsules containing a hydrophobic core material, the process comprising:
  (a) adding to the core material a polyisocyanate at least partially soluble in the core material to form a substantially hydrophobic liquid phase;
  (b) emulsifying the hydrophobic liquid phase with an aqueous continuous phase comprising a colloidal stabilizer to form an emulsion of microdroplets of the hydrophobic liquid phase suspended in the aqueous phase;
  (c) adding to the emulsion a polyamine to begin an initial wall-forming reaction of the polyamine with the polyisocyanate; and
  (d) adding to the emulsion an aqueous solution comprising a catalytic amount of an alkaline base soluble in the aqueous continuous phase and a water-soluble surfactant having molecules possessing multiple sulfur-containing substituents selected from the group consisting of sulfates and sulfonates, so as to form a suspension in the aqueous continuous phase of microcapsules each comprising a polyurea shell surrounding a microdroplet, the alkaline base serving to promote reaction between molecules of the colloidal stabilizer and molecules of the polyisocyanate to form molecules that are incorporated into the microcapsule shells.

24. A process for preparing microcapsules as recited in claim 23 wherein the surfactant is selected from the group consisting of condensed naphthalene sulfonates and sodium dodecyl benzenesulfonate salt.

25. A process for preparing microcapsules as recited in claim 24 wherein the concentration of surfactant in the suspension is within a range of about 0.10% to about 3.0% relative to the mass of the hydrophobic phase.

26. A process for preparing microcapsules as recited in claim 25 wherein the concentration of surfactant in the suspension is within a range of about 0.30% to about 2.0% w/w relative to the mass of the hydrophobic phase.

27. A process for preparing microcapsules as recited in claim 23 wherein the colloidal stabilizer is selected from the group consisting of polyvinylalcohol, mixtures of polyvinylalcohol and polyvinylacetate, polyvinylpyrrolidone, carboxymethyl cellulose, and hydroxyethyl cellulose.

28. A process for preparing microcapsules containing a hydrophobic liquid core material, the process comprising:
  (a) adding to the core material a polyisocyanate at least partially soluble in the core material to form a substantially hydrophobic liquid phase;
  (b) emulsifying the hydrophobic liquid phase with an aqueous continuous phase comprising a polyhydroxylated colloidal stabilizer to form an emulsion of microdroplets of the hydrophobic liquid phase suspended in the aqueous phase; and
  (c) adding to the emulsion of microdroplets a polyamine soluble in the aqueous continuous phase and reactive with the polyisocyanate; and, either before or simultaneously with the polyamine, a catalytic amount of an alkaline base soluble in the aqueous continuous phase, the base serving to promote reaction between molecules of the colloidal stabilizer and molecules of the polyisocyanate, thereby forming a suspension in the aqueous continuous phase of microcapsules each comprising a polyurea shell surrounding a microdroplet.

* * * * *